(12) United States Patent
Magliaro

(10) Patent No.: US 7,225,459 B2
(45) Date of Patent: May 29, 2007

(54) METHOD AND SYSTEM FOR DYNAMICALLY ADJUSTING VIDEO BIT RATES

(75) Inventor: Maximilian Matthew Magliaro, Philipsburg, PA (US)

(73) Assignee: Numerex Investment Corproation, Wilmington, DE (US)

( * ) Notice: Subject to any disclaimer, the term of this patent is extended or adjusted under 35 U.S.C. 154(b) by 1086 days.

(21) Appl. No.: 10/008,100

(22) Filed: Nov. 13, 2001

(65) Prior Publication Data

US 2003/0074674 A1   Apr. 17, 2003

Related U.S. Application Data

(60) Provisional application No. 60/329,863, filed on Oct. 17, 2001.

(51) Int. Cl.
*H04N 7/173* (2006.01)
(52) U.S. Cl. .................... 725/98; 725/93; 725/95; 725/96; 725/118
(58) Field of Classification Search .......... 725/92–96, 725/98, 118; 709/219; 348/14.12–14.13; 375/224, 240.13; 370/224
See application file for complete search history.

(56) References Cited

U.S. PATENT DOCUMENTS

| | | | |
|---|---|---|---|
| 5,821,986 A | 10/1998 | Yuan et al. | |
| 6,434,606 B1 | 8/2002 | Borella et al. | |
| 6,658,027 B1 | 12/2003 | Kramer et al. | |

(Continued)

FOREIGN PATENT DOCUMENTS

WO    WO 96/14711    5/1996

(Continued)

OTHER PUBLICATIONS

Company Press Release, "New PictureTel 900 Series—Video Conferencing as It Should Be, New iPower™ Architecture Delivers PC Foundation for New Generation of Integrated Collaboration Solutions". Jul. 31, 2000. Press release previously located at http://biz.yahoo.com/bw/000731/ma_picture.html.

*Primary Examiner*—Kieu-Oanh Bui
(74) *Attorney, Agent, or Firm*—King & Spalding

(57) ABSTRACT

A system and method for dynamically adjusting the bit rate of a data transmission. A sending endpoint transmits data, such as video conferencing data across a network to a receiving endpoint. The receiving endpoint maintains information about the performance of the network and uses the information to determine when to request an increase or a decrease in the transmission rate. The information is maintained as a set of called parameters. The called parameters provide historical and statistical information about the call. For example, by maintaining information that indicates the number of intervals since the last increase was attempted and the number of intervals that the last increase was maintained, the receiving endpoint can avoid oscillating between a higher bit rate and a lower bit rate. If a bit rate increase was requested, but was not maintained for a sufficient period of time, then the endpoint will delay a subsequent request for an increase until the call parameters indicate that the increase will be successful. The call parameters include both predetermined and dynamic thresholds. The thresholds are compared against measured network performance indicators to determine when to request an adjusted bit rate.

23 Claims, 5 Drawing Sheets

U.S. PATENT DOCUMENTS

| | | |
|---|---|---|
| 6,862,298 B1 | 3/2005 | Smith et al. ................ 370/516 |
| 2002/0126707 A1 | 9/2002 | Tong et al. |
| 2002/0191107 A1 | 12/2002 | Hu et al. |
| 2003/0012138 A1* | 1/2003 | Abdelilah et al. .......... 370/231 |
| 2003/0043784 A1 | 3/2003 | Selin .......................... 370/352 |
| 2004/0019491 A1 | 1/2004 | Rhee |

FOREIGN PATENT DOCUMENTS

| | | |
|---|---|---|
| WO | WO 2006/011867 A1 | 2/2006 |

* cited by examiner

METHOD AND SYSTEM FOR DYNAMICALLY ADJUSTING VIDEO BIT RATES

RELATED APPLICATION

This patent application claims priority to U.S. Provisional Patent Application Ser. No. 60/329,863 entitled "Method and System for Dynamically Adjusting Video Bit Rates" filed Oct. 17, 2001.

FIELD OF THE INVENTION

The present invention generally relates to adjusting a video bit rate and more particularly relates to a method for dynamically adjusting a video bit rate to compensate for changing network conditions.

BACKGROUND OF THE INVENTION

A computer network is used for a number of different purposes, including sending electronic mail, browsing the Internet, sharing files and conducting videoconferences. The various data transmissions carried by the network cause fluctuations in the available network bandwidth. Each data transmission sent over the network consumes some portion of the network's total bandwidth, leaving progressively less bandwidth for other transmissions. With respect to videoconferencing, the fluctuation in available bandwidth can be particularly troublesome. For example, if an individual is engaged in a videoconference with another person, an increase in network traffic can degrade the quality of the video or audio.

In response to an increase in network traffic, the videoconference data transmission rate may be reduced in order to minimize lag, transmission gaps, or connection loss. However, if additional bandwidth becomes available on the network due to a decrease in network traffic, then continued transmission at the reduced bit rate is unnecessary. If the videoconference system could detect the additional available bandwidth, then the videoconference data transmission rate could be increased to take advantage of the available bandwidth.

Some videoconferencing systems reduce the videoconference transmission rate, but do not attempt to increase the transmission rate if additional bandwidth becomes available. Other systems increase and decrease the transmission rate, but do so in a manner that causes the transmission rate to "thrash" or to oscillate between a higher transmission rate and a lower transmission rate.

Therefore, there is a need in the art for detecting changes in the available bandwidth and optimizing the bit rate of a videoconference transmission. There is a further need to keep proper statistical and historical data to allow the optimization to be made without thrashing between higher and lower transmission rates.

SUMMARY OF THE INVENTION

The present invention meets the needs described above by providing a method for dynamically adjusting the transmitted video bit rate. A request to increase or decrease the bit rate is based upon the performance of the network. A videoconference call or call is established between two endpoints. The endpoints are referred to as a sending endpoint and a receiving endpoint for simplicity. The sending endpoint encodes video and audio data and transmits it to the receiving endpoint which decodes the video and audio data and plays back the data.

The receiving endpoint maintains information about the call and the network performance as a set of call parameters. The call parameters include variables and counters. The call parameters provide historical and statistical information about the call that can be used by the receiving endpoint to determine whether and when to request an increase or decrease in the bit rate. For example, by maintaining information that indicates the number of intervals that the last increase was maintained, the receiving endpoint can avoid thrashing. If a bit rate increase was requested, but was not maintained for a sufficient period of time, then the endpoint will delay a subsequent request for an increase until the call parameters indicate that the increase will be successful.

One aspect of the invention provides a method for setting up a call and dynamically adjusting the bit rate during the call to respond to changing network conditions. The method to dynamically adjust the bit rate can be implemented in either hardware or software associated with the receiving endpoint. The method begins by conducting an available bandwidth test. The available bandwidth test determines the bandwidth available for the call. Once the available bandwidth is determined, then the initial transmission rates for the video and audio are selected and the video setup and the audio setup for the call are completed. In addition, the call parameters are initialized.

The call is monitored throughout its duration to determine whether to request a reduction or an increase in the bit rate. The monitoring includes determining both video and audio losses, as well as an estimated received bit rate. The video and audio losses are compared to loss thresholds. The loss thresholds include both predetermined loss thresholds and dynamic loss thresholds. The call parameters are adjusted based upon the measured losses and the comparisons to the loss thresholds. In addition, a request to increase or decrease the bit rate is based upon the loss threshold comparisons.

The method supports requests to increase or to decrease the bit rate. Once the bit rate has been reduced, the performance of the network continues to be monitored so that if network conditions improve, then a bit rate increase can be requested.

These and other aspects, features and advantages of the present invention may be more clearly understood and appreciated from a review of the following detailed description of the disclosed embodiments and by reference to the appended drawings and claims.

DETAILED DESCRIPTION

The present invention is directed to a method for dynamically adjusting a video transmission rate in response to changing network conditions. Briefly described, information about the performance of the network is maintained and is used by a receiving endpoint to determine when to request an increase or a decrease in the video bit rate. For example, if there are sustained periods of video losses, then the receiving endpoint requests a bit rate reduction. However, if there are sustained periods of low video losses, then the receiving endpoint requests an increase in the bit rate. The information that is maintained includes the number of intervals since the last bit rate increase was attempted and the number of intervals that the last bit rate increase was maintained. By using this information, the receiving endpoint can avoid thrashing. If a bit rate increase has been requested, but has not been maintained for a sufficient period of time, then the endpoint delays a request for an increase until the information indicates that an increase will be successful.

Exemplary Operating Environment

Figure 1:
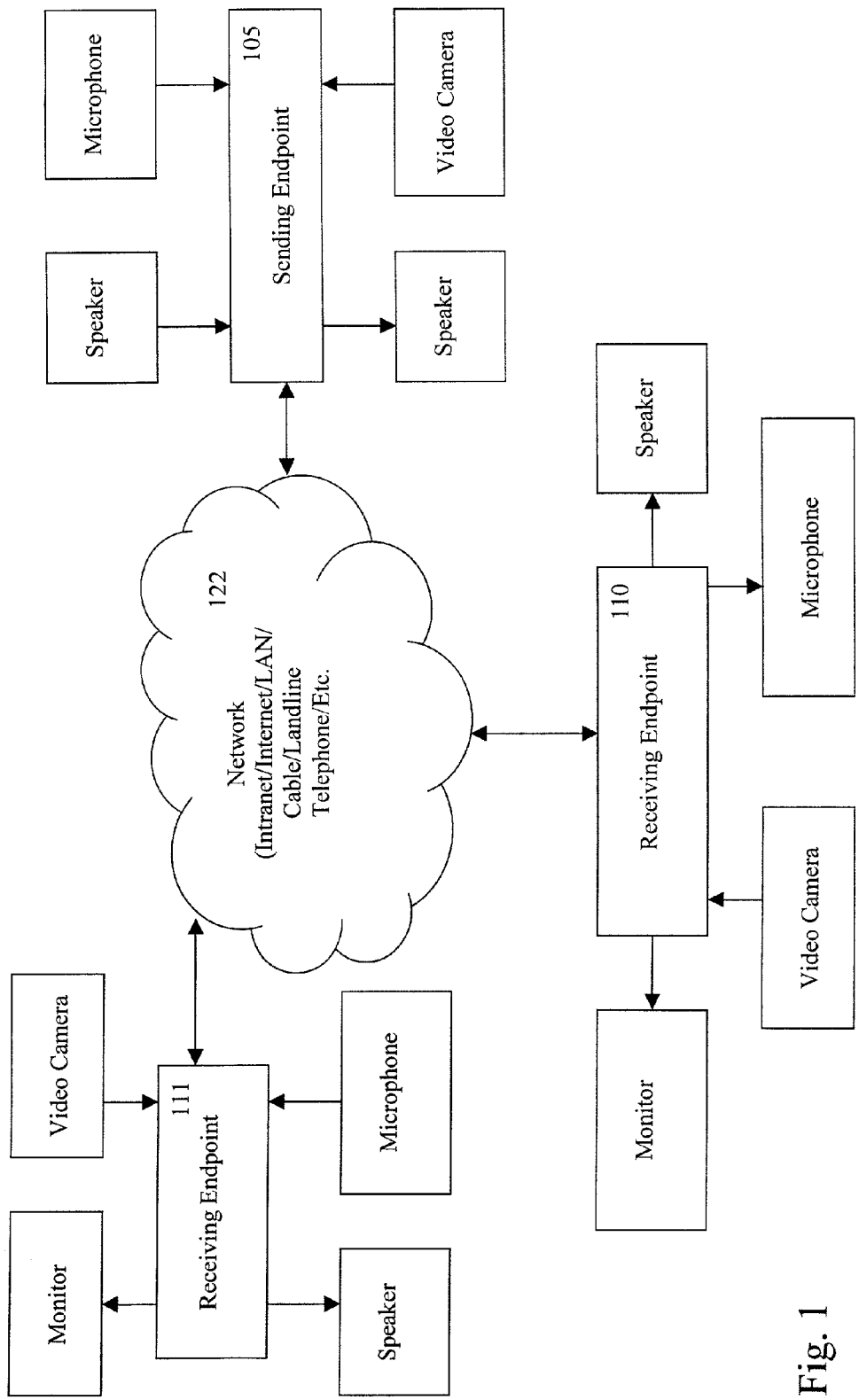
FIG. 1 is a block diagram of a computer network illustrating the operating environment for an exemplary embodiment of the present invention.

FIG. 1 and the following discussion are intended to provide a brief, general description of a videoconferencing environment 100 that is a suitable operating environment for the present invention. While the invention will be described in connection with multiple computers that are connected via a network, those skilled in the art will recognize that other, alternative configurations are also possible.

FIG. 1 includes three endpoints, 105, 110 and 111. Typically, an endpoint is a computer system that is capable of both sending and receiving videoconferencing data, as well as other types of data. For example, an endpoint can also send and receive electronic messages and files, in addition to videoconferencing data. An endpoint typically include a video camera, a monitor or other display device, a microphone, and a speaker. An endpoint can also include other peripheral devices as well. Additional details of an endpoint are discussed below in connection with FIG. 2. Although FIG. 1 illustrates three endpoints, the present invention can work with more than three endpoints. The endpoints are connected via a network, such as an intranet, the Internet, a local area network ("LAN"), etc. The network can support a single videoconference or multiple videoconferences.

Exemplary Endpoints

Figure 2:
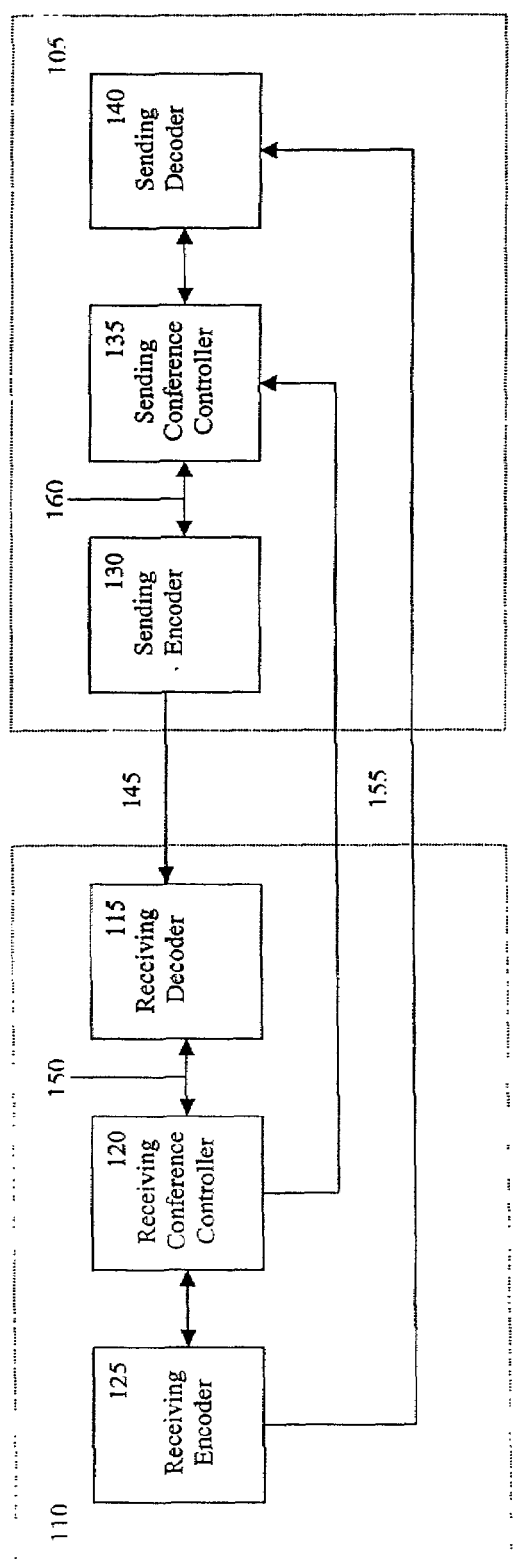
FIG. 2 is a block diagram of a pair of endpoints in accordance with an exemplary embodiment of the present invention.

FIG. 2 illustrates an exemplary sending endpoint 105 and an exemplary receiving endpoint 110. Although endpoints are typically capable of both sending and receiving videoconferencing data, the endpoints illustrated in FIG. 2 have been labeled as either a sending endpoint or as a receiving endpoint for simplicity. The sending endpoint 105 includes a sending encoder 130, a sending conference controller 135 and a sending decoder 140. The receiving endpoint 110 includes a receiving encoder 125, a receiving conference controller 120 and a receiving decoder 115. The encoders encode data, such as video or audio data, and transmit the data to a decoder. The decoders receive the transmitted data and decode the data for display or playback at the receiving endpoint. The transmission between a sending endpoint and a receiving endpoint is referred to herein as a "call." Although shown separately, the encoder and the decoder can be combined into a single block. A combined encoder and decoder is referred to herein as a CODEC (coder/decoder). A CODEC can be implemented in either hardware or software.

Typically, a sending encoder is capable of transmitting data using multiple encoding schemes and multiple bit rates simultaneously. An implementation of an encoder using a particular encoding scheme at a particular bit rate is referred to herein as an "engine."

The conference controllers arrange the connection between the endpoints and negotiate the encoding scheme and the bit rate used. The conference controllers also support communications between the endpoints regarding changes in the transmission, such as a request for an increase or a decrease in the transmitted bit rate. Communication between the sending endpoint and the receiving endpoint typically follows a communication standard, such as an ITU standard.

Call Parameters

The present invention maintains information about each call to determine whether to request an increase or decrease in the bit rate. The information that is maintained includes the number of intervals since the last increase was attempted, the number of intervals that the last increase was maintained, and the number of times an increase was followed by a decrease. In one embodiment, the information is maintained as a number of call parameters. The call parameters include variables and counters. The initial or default values for some of the variables can be stored in a registry, such as the WINDOWS operating system registry. The default values and the minimum and maximum values stored in the registry for one embodiment of the invention are shown below in Table 1. The use of the registry keys is described in more detail in connection with FIGS. 3–5 below. As will be apparent to those skilled in the art, the values shown in Table 1 are for illustration only. The invention will also work with other values.

TABLE 1

| Registry Key Name | Default if not specified in registry | Minimum | Maximum |
|---|---|---|---|
| g711PlusMinBitRate | 1544000 | 384000 | 1000000000 |
| g711MinBitRate | 384000 | 128000 | 1000000000 |
| Xinterval | 3000 | 100 | 30000 |
| YpercentLoss | 0.02 | 0.002 | 0.15 |
| YpercentAudioLoss | 0.01 | 0.001 | 0.15 |
| BrateDown | 0.20 | 0.01 | 0.50 |
| QdecreaseWindow | 0.50 | 0.1 | 0.9 |
| Pwrroot | 2.0 | 1.1 | 5.0 |
| Tcoeff | 24.0 | 1.0 | 100.0 |
| Vroot | 0.5 | 0.1 | 2.0 |
| Mperfection | .001 | 0.0 | 0.01 |
| BrateUp | 0.20 | 0.01 | 0.50 |
| PPerfect | 3 | 1 | 20 |
| PFinit | 1 | 1 | 20 |
| PFincInit | 2.0 | 1.1 | 10.0 |
| PFdecInit | 1.5 | 1.1 | 10.0 |
| PFmax | 60 | 10 | 200 |
| PFmin | 1 | 1 | 10 |

The call parameters provide historical and statistical information about the call that can be used by the receiving endpoint to determine whether and when to request an increase or decrease in the bit rate. For example, by maintaining information that indicates the number of intervals that the last increase was maintained, the receiving endpoint can avoid thrashing. If bit rate increases have been requested, but have not been maintained for a sufficient period of time, then the endpoint will delay a request for an increase until the call parameters indicate that the increase will be successful.

Method for Dynamic Bit Rate Adjustment

Figure 3:
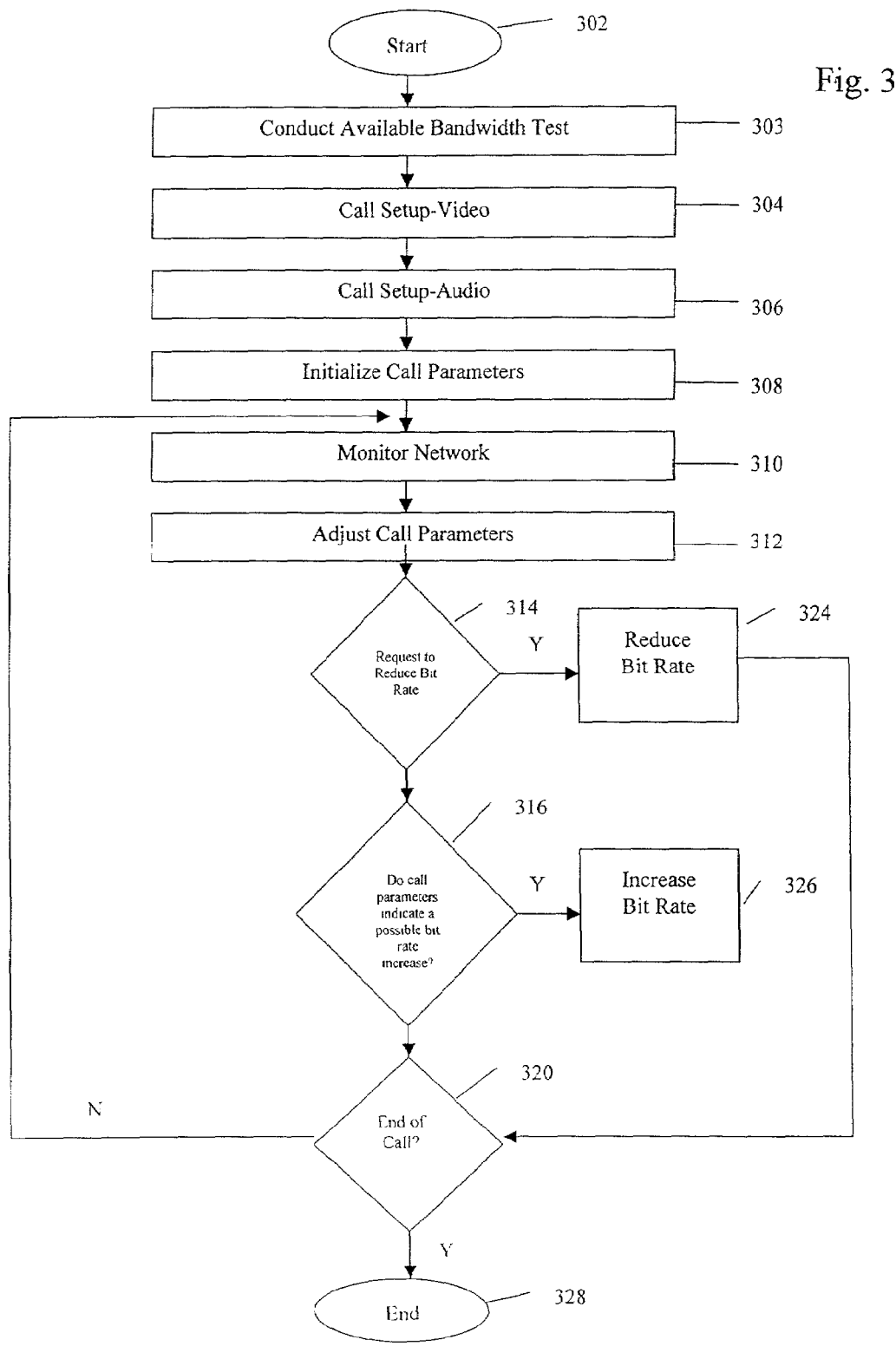
FIG. 3 is a flow diagram of a method for dynamically adjusting the bit rate of a call in accordance with an exemplary embodiment of the present invention.

FIG. 3 illustrates an exemplary method for setting up a call and dynamically adjusting the bit rate during the call to respond to changing network conditions. In one embodiment, the method to dynamically adjust the bit rate is implemented in software that is associated with the decoder of the receiving endpoint. The method uses call parameters to maintain information about the call. Values for the call parameters can be stored in the registry, as described above in connection with Table 1. The registry key names and parameter names that correspond to the call parameters used in one embodiment are shown herein in parenthesis for illustration purposes. As will be apparent to those skilled in the art, the names and the values can be other than those used herein.

The method 300 begins at the start step 302. From step 302 the method proceeds to set up the call in steps 303, 304 and 306. In step 303, an available bandwidth test is performed. The available bandwidth test determines the bandwidth available for the call. Typically, the sending endpoint sends data at a given bit rate to the receiving endpoint. The receiving endpoint receives the data and calculates the received bit rate for the data. The receiving endpoint communicates the received bit rate to the sending endpoint. The sending endpoint then determines the bandwidth available for the call. The available bandwidth test does not require that the user specify an initial bit rate for the call, as required by some existing systems.

From step 303, the method proceeds to step 304. In step 304, the video portion of the call is setup. The details of setting up the video portion of the call are discussed in more detail below in connection with FIG. 4. The audio portion of the call is setup in step 306. During the audio portion of the call setup, the endpoints negotiate the audio CODEC that will be used for the call. The audio CODEC is selected based upon the results of the available bandwidth test. In one implementation, the received bit rate reported by the receiving endpoint is compared with one or more predefined bit rates to select the appropriate CODEC. Typically, the predefined bit rates are stored in the registry (g711PlusMinBitRate, g711MinBitRate).

Once the video and audio portions of the call are set up, then the method proceeds to step 308. In step 308, the call parameters used to dynamically adjust the bit rate of the call are initialized. The parameters include both variables and counters. The parameters include a rate increase counter (Lincrease) that indicates the number of consecutive intervals that have elapsed without significant loss. The rate increase counter (Lincrease) is set to an initial value of −1, indicating that there have been no increases. The variable number of sample intervals (F) is set to an initial value specified in the registry (pFinit). In addition, the loss counter (lossCounter) and the loss threshold counter (perfectCounter) are initialized to zero.

In step 310, the call is monitored to determine whether to request a reduction or an increase in the bit rate. The monitoring includes checking both video and audio losses. In one embodiment, the call is sampled and the losses are calculated periodically. The sampling period (Xinterval) can be specified in the registry. In addition to calculating the video and audio losses, the estimated received bit rate is also calculated for each sample interval. The video and audio losses are compared to predetermined loss thresholds. Typically, the predetermined loss thresholds are stored in the registry. For example, to determine whether to request a bit rate reduction, the video loss is compared to a video reduction loss threshold (YpercentLoss) and the audio loss is compared to an audio loss threshold (YpercentAudioLoss). To determine whether to request a bit rate increase, the video loss is compared to a video increase loss threshold (Mperfection).

Based upon the measured losses and the comparisons to the loss thresholds, the call parameters are adjusted in step 312. For example, if the video loss is greater than the video reduction loss threshold (YpercentLoss) or the audio loss is greater than the audio loss threshold (YpercentAudioLoss), then a loss counter (lossCounter) is incremented. The loss counter indicates the number of consecutive intervals that have occurred in which either the video or audio loss exceeded a loss threshold. However, if the video loss is less than the video reduction loss threshold and the audio loss is less than the audio loss threshold, then the loss counter is decremented (but not below 0). In addition, if no rate decrease is needed because the video and audio losses are less than the loss thresholds, then the rate increase counter (Lincrease) remains enabled (LcountIncrease is true) and the current value of the rate increase counter is maintained. For example, the value of the rate increase counter (Lincrease) is maintained at −1 until the first rate increase occurs. However, if a rate decrease is requested because the video loss or the audio loss exceeds a loss threshold, then the rate increase counter is disabled (by setting LCountIncrease to false) to freeze the rate increase counter (Lincrease) at its current value.

In addition, if the video loss is less than or equal to the video increase loss threshold (Mperfection), then a loss threshold counter (perfectCounter) is incremented. The loss threshold counter indicates the number of consecutive intervals that have occurred in which the video loss is less than or equal to the video increase loss threshold. If the video loss is greater than the video increase loss threshold, then the loss threshold counter is reset to zero.

From step 312 the method proceeds to step 314. In step 314 a determination is made as to whether to request a reduction in the bit rate. A reduction in the bit rate is requested if the loss counter (lossCounter) is greater than a dynamic reduction threshold (Zthresh). The dynamic reduction threshold is based, in part, on the maximum estimated received bit rate. In one embodiment, the dynamic reduction threshold (Zthresh) is calculated according to the following formula:

$$Zthresh = int((Pwrroot**a)+0.5)$$

$$\text{where } a = t/((r/1000)**v)$$

The int function rounds a value down to the nearest integer. The values for Pwrroot (Pwrroot), t (Tcoeff) and v (Vroot) are predetermined and are typically specified in the registry. The value for r is the maximum estimated bit rate, in bits per second. If the bit rate is lowered, then r is set to the reduced rate, so that subsequent estimated bit rates are compared to this lower rate. The value of the dynamic reduction threshold (Zthresh) increases as the bit rate decreases. This causes higher bit rate calls to request a reduced bit rate before lower bit rate calls. If a sending endpoint is transmitting to multiple receiving endpoints using different bit rates, then adjusting the dynamic reduction threshold causes the bit rates to even out over time instead of allowing a higher bit rate call to continue at a higher bit rate while reducing the bit rate of a lower bit rate call.

The value of the dynamic reduction threshold (Zthresh) is modified to be equal to (Zthresh*QdecreaseWindow) for a number of intervals (Zthresh intervals) directly following any bit rate increase. Modifying the dynamic reduction threshold (Zthresh) following a bit rate increase ensures that the additional network bandwidth required by a request to increase the bit rate does not cause a reduction in the bit rates of other calls unless the other calls are operating at sufficiently high bit rates. This is accomplished by accepting losses for fewer intervals. In other words, if losses are detected for (Zthresh*QdecreaseWindow) intervals (instead of the usual Zthresh intervals) following an increase, then the endpoint that requested the increase will request a bit rate reduction. Thus, increases that fail are backed off, rather than forcing other endpoints to request reduction. The value of the QdecreaseWindow parameter is typically predetermined and specified in the registry.

If the determination in step 314 is to request a bit rate reduction, then the Yes branch is followed to step 324. In step 324, the receiving endpoint requests a reduced bit rate that is a predetermined percentage of the estimated received bit rate. In one embodiment, the percentage, (BRateDown) is specified in the registry. In response to receiving a request for a reduced bit rate, the sending endpoint reduces the bit rate.

However, if the determination in step 314 is that the loss counter (lossCounter) is less than a dynamic reduction threshold (Zthresh), then the method proceeds to step 316. In step 316, a determination is made as to whether the call parameters indicate that an increase in the bit rate should be considered. An increase in the bit rate is considered if the loss threshold counter (perfectCounter), exceeds a dynamic increase threshold (P+F). In one embodiment, P (pPerfect) is a predetermined number of sample intervals and F is a variable number of sample intervals. Typically, the value for P and the values needed to calculate F (pFinit, pFincInit, pFdecInit, pFmax, pFmin) are predetermined and are stored in the registry.

If the determination in step 316 is that a bit rate increase should be considered, then the Yes branch is followed to step 326. In step 326, additional call parameters are evaluated to determine whether to request a bit rate increase. If the determination is to request an increase in the bit rate, then a request to increase the bit rate is generated. Step 326 is discussed in more detail in connection with FIG. 5.

However, if the determination in step 316 is that a bit rate should not be considered, then the No branch is followed to step 320. Step 320 can also be reached from steps 324 and 326. In step 320, a determination is made as to whether the call has ended. If the call has not ended, then the No branch is followed to step 310 and steps 310–326 are repeated. However, if the call has ended, then the Yes branch is followed to step 328 and the method ends.

Although FIG. 3 illustrates that steps 314 and 316 are performed sequentially, those skilled in the art will appreciate that the steps can be performed in parallel or that the steps can be performed in a different order than that illustrated by FIG. 3.

Video Call Setup

Figure 4:
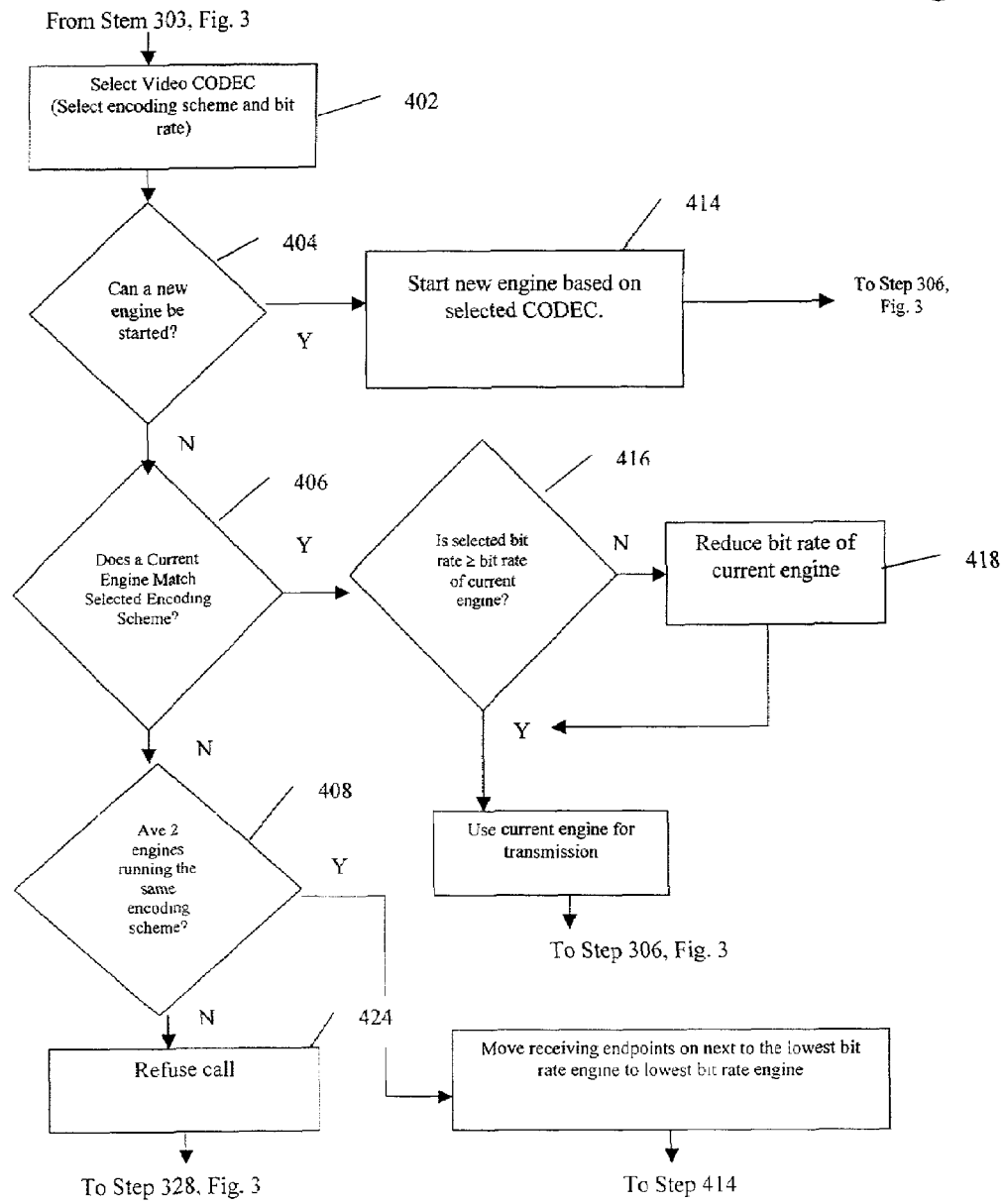
FIG. 4 is a flow diagram of a method for setting up the video portion of a call in accordance with an exemplary embodiment of the present invention.

FIG. 4 illustrates the steps of an exemplary method for setting up the video portion of a call. FIG. 4 corresponds to step 304 of FIG. 3. From step 303 of FIG. 3, the method proceeds to step 402 and a CODEC is selected. Selecting a CODEC includes selecting an encoding scheme, as well as a bit rate. Typically, the available CODEC's are prioritized based on bit rate. For example, a particular encoding scheme is associated with a minimum bit rate. If the available bit rate is less than the minimum bit rate, then that encoding scheme is not selected. Once the CODEC is selected, then the method proceeds to step 404. In step 404 a determination is made as to whether a new engine can be started. Typically, there is a limit to the number of engines that can be running simultaneously at a sending endpoint. The limit is predetermined and is typically stored in the registry. If a new engine can be started, then the Yes branch is followed from step 404 to step 414. In step 414 a new engine is started using the encoding scheme and the bit rate determined in step 402. The method then proceeds to step 306 of FIG. 3.

However, if the determination in step 404 is that a new engine cannot be started, then the No branch is followed to step 406. In step 406 a determination is made as to whether a current engine is using the encoding scheme selected in step 402. If a current engine is using the selected encoding scheme, then the Yes branch is followed to step 416. In step 416 a determination is made as to whether the bit rate selected in step 402 is greater than or equal to the bit rate of the current engine. If the selected bit rate is greater than or equal to the bit rate of the current engine, then the Yes branch is followed to step 422. In step 422 the current engine begins transmitting to the receiving endpoint using its current bit rate. The method then proceeds from step 422 to step 306 of FIG. 3.

However, if the determination in step 416 is that the selected bit rate is less than the bit rate of the current engine, then the No branch is followed to step 418. In step 418 the bit rate of the current engine is reduced. If there are multiple engines currently running the selected encoding scheme, then the current engine having the lowest bit rate is the one that is reduced. The method then proceeds to step 422.

If the determination in step 406 is that a current engine is not using the selected encoding scheme, then the No branch is followed to step 408. In step 408 a determination is made as to whether at least two engines are currently running the same encoding scheme. If at least two engines are running the same encoding scheme, then the Yes branch is followed to step 410. In step 410, two of the engines that are using the same encoding scheme are consolidated. In particular, the receiving endpoint(s) for the engine having the next to the lowest bit rate is moved to the engine having the lowest bit rate. By moving the receiving endpoint(s), an engine becomes available and the method proceeds from step 410 to step 414. The method then proceeds as above from step 414.

If the determination in step 408 is that no two engines are using the same encoding scheme, then the No branch is followed to step 424 and the call is refused. If the call is refused, then the method proceeds to step 328 of FIG. 3.

Increasing the Bit Rate

Figure 5:
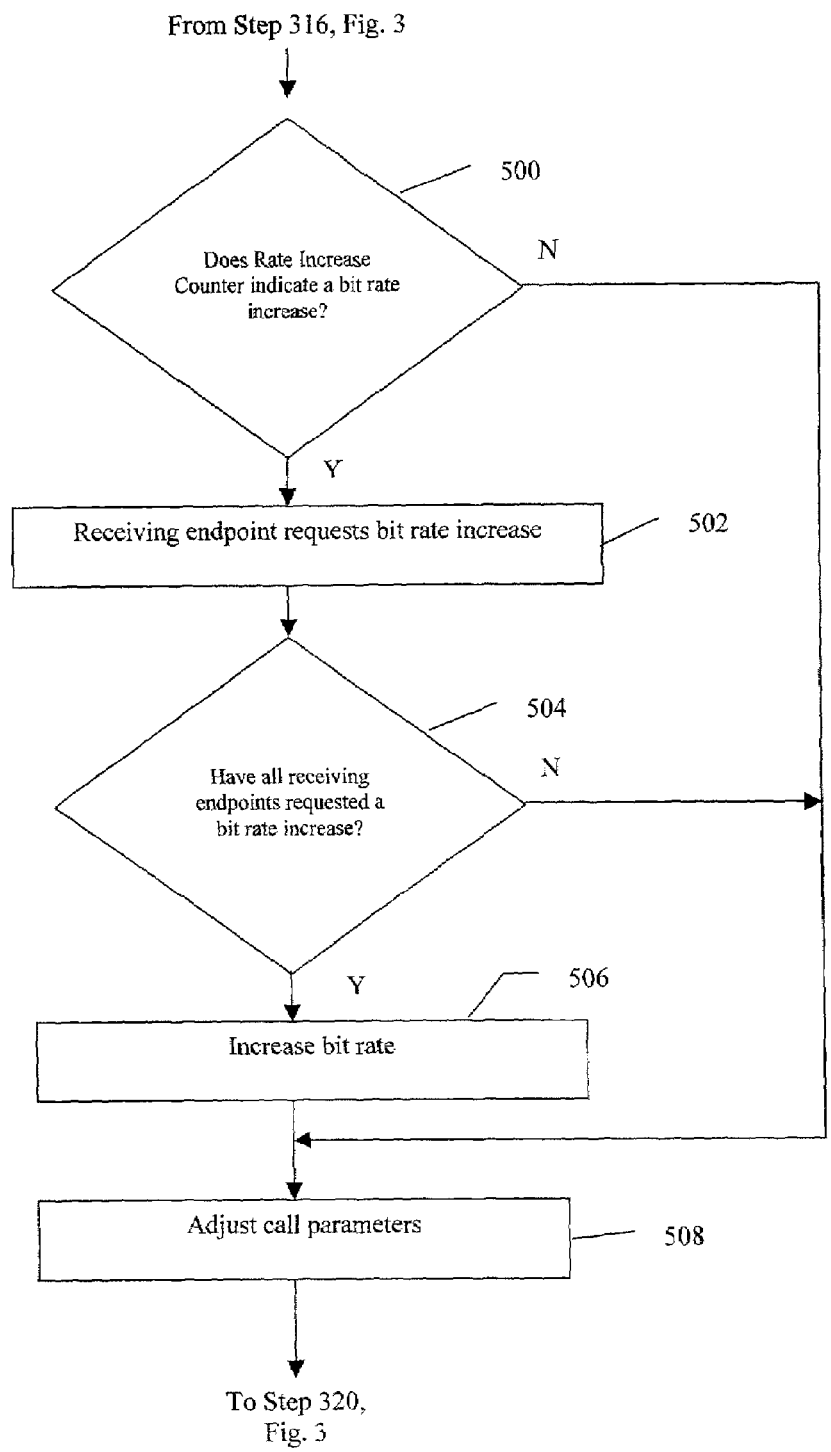
FIG. 5 is a flow diagram of a method for dynamically increasing the bit rate of a call in accordance with an exemplary embodiment of the present invention.

FIG. 5 illustrates the steps of an exemplary method for increasing the bit rate. FIG. 5 corresponds to step 326 of FIG. 3. If the Yes branch is followed from step 316, then the method proceeds to step 500. In step 500, the rate increase counter (Lincrease) is examined to determine whether it indicates that a bit rate increase should be requested. If the rate increase counter is equal to −1 or is greater than or equal to the dynamic increase threshold (P+F), then the method proceeds to step 502 and the receiving endpoint requests a bit rate increase. The dynamic increase threshold includes a fixed number of intervals and a variable number of intervals. The fixed number of intervals, P, can be specified in the registry (pPerfect). The initial value for the variable number of intervals, F, can also be specified in the registry (pFinit). However, the variable number of intervals is modified during the call, as discussed below. In one embodiment, the increase is a predetermined percentage of the maximum received bit rate. The percentage (BRateUp) is typically stored in the registry.

The maximum received bit rate is computed for each sample interval. For example, at the end of the first sample interval, the maximum received bit rate is the estimated received bit rate for the first interval. At the end of the second interval, the maximum received bit rate is the maximum of the estimated received bit rate for the first interval and the second interval. The maximum received bit rate is updated for intervals where the loss is less than the video increase loss threshold (Mperfection).

From step 502 the method proceeds to step 504. In step 504 the sending endpoint makes a determination as to whether all receiving endpoints for the engine have requested an increase. If all the receiving endpoints for the engine have requested an increase, then the method proceeds to step 506. Otherwise, the method proceeds to step 508.

In step 506 the sending endpoint increases the bit rate. Once the bit rate is increased, then the method proceeds from step 506 to step 508. In step 508 the relevant call parameters are adjusted. The adjustments depend upon whether an increase occurred or not. For example, if a bit rate increase occurred, then in step 508, the rate increase counter (Lincrease) is reset to zero, the rate increase counter is enabled (by setting LcountIncrease to true), and the variable number of intervals (F) is adjusted. If F has reached a maximum (pFmax), then the number of intervals (F) is divided by two (unless pFdecInit is greater than two in which case it is divided by pFdecInit), but not lower than a minimum value (pFmin). Finally, the maximum received bit rate is reset to zero.

Dividing the variable number of intervals (F) once it has reached a maximum (pFmax), addresses the situation where the available bandwidth has been severely limited for a long time, but then suddenly bandwidth becomes available. The division of the variable number of intervals reduces the dynamic increase threshold (P+F) and allows the bit rate to be increased sooner.

If no bit rate increase takes place, then in step 508, the rate increase counter is enabled (by setting LcountIncrease to true) to keep counting intervals since the last increase and the variable number of intervals (F) is multiplied by a multiplier (pFincInit). Multiplying F by pFincInit increases the dynamic increase threshold (P+F) so that interruptions in call quality from attempted bit rate increases become rare if there is insufficient bandwidth to honor the increase for a sustained period of time. Once the appropriate call parameters have been adjusted in step 508, the method proceeds to step 320 of FIG. 3.

Alternative embodiments will be apparent to those skilled in the art to which the present invention pertains without departing from its spirit and scope. Accordingly, the scope of the present invention is described by the appended claims and is supported by the foregoing description.

What is claimed is:

1. A method for dynamically decreasing a bit rate of a transmission, comprising:
   determining a video loss for the transmission;
   comparing the video loss to a predetermined video reduction loss threshold;
   if the video loss exceeds the predetermined video reduction loss threshold, then incrementing a loss counter, the loss counter indicating a number of consecutive intervals that the video loss exceeded the predetermined video reduction loss threshold;
   comparing the loss counter to a dynamic reduction threshold;
   if the loss counter exceeds the dynamic reduction threshold, then requesting a reduced bit rate; and
   receiving the reduced bit rate.

2. The method of claim 1, further comprising:
   in response to the request for the reduced bit rate, disabling a rate increase counter, so that the rate increase counter does not increment, the rate increase counter indicating a number of consecutive intervals that have elapsed since a bit rate increase.

3. The method of claim 1, wherein the dynamic reduction threshold increases as the bit rate decreases.

4. The method of claim 1, wherein determining a video loss for the transmission occurs periodically.

5. The method of claim 1, wherein requesting a reduced bit rate comprises:
   requesting a reduced bit rate that is a predetermined percentage of a current bit rate.

6. A method for dynamically increasing a bit rate of a transmission, comprising:
   determining a video loss for the transmission;
   comparing the video loss to a predetermined video increase loss threshold;
   if the video loss exceeds the predetermined video increase loss threshold, then resetting a loss threshold counter, the counter indicating the number of consecutive intervals in which the video loss is below the predetermined video increase loss threshold;
   comparing the loss threshold counter to a dynamic increase threshold;
   if the loss threshold counter exceeds the dynamic increase threshold, then comparing a rate increase counter to the dynamic increase threshold;
   if the rate increase counter is greater than or equal to the dynamic increase threshold, then requesting an increase in the bit rate;
   adjusting the dynamic increase threshold; and
   receiving an increased bit rate.

7. The method of claim 6, further comprising:
   if the rate increase counter is less than the dynamic increase threshold, then maintaining the bit rate and increasing the dynamic increase threshold.

8. The method of claim 6, wherein requesting an increase in the bit rate comprises:
   requesting an increase that is a predetermined percentage of the bit rate.

9. The method of claim 6, wherein the dynamic increase threshold includes a predetermined component and a variable component.

10. The method of claim 9, further comprising:
    if an increase in the bit rate is requested, then determining whether the variable component has reached a maximum; and
    if the variable component has reached a maximum, then reducing the variable component.

11. The method of claim 6, further comprising:
    reducing a dynamic reduction threshold for a plurality of intervals after the bit rate increase.

12. The method of claim 6, further comprising:
    if the loss threshold counter exceeds the dynamic increase threshold, but a bit rate increase is not requested, then increasing the dynamic increase threshold.

13. The method of claim 6, further comprising:
    if a bit rate increase is requested, then reducing the dynamic increase threshold.

14. A method for dynamically adjusting the bit rate of a transmission, comprising:
- maintaining a plurality of parameters, including a rate increase counter that indicates a number of consecutive intervals since the last rate increase, a predetermined video loss reduction threshold, a dynamic reduction threshold, a predetermined video increase loss threshold, a dynamic increase threshold, and a loss threshold counter that indicates a number of consecutive intervals where a video loss is less than or equal to the predetermined video increase loss threshold;
- sampling the transmission to determine a video loss;
- based on the video loss, determining whether to request a bit rate adjustment by comparing the video loss to at least one of the plurality of parameters;
- if the determination is to request a bit rate adjustment, then requesting a bit rate adjustment; and
- based upon the determination, adjusting at least one of the parameters to reflect the determination.

15. The method of claim 14, wherein the predetermined video loss reduction threshold and the predetermined video increase loss threshold are maintained in a registry.

16. The method of claim 14, wherein the transmission is sampled periodically and a sampling interval is maintained in a registry.

17. The method of claim 14, wherein the dynamic increase threshold, includes a predetermined component and a variable component.

18. The method of claim 14, wherein the dynamic reduction threshold increases as the bit rate decreases.

19. The method of claim 14, wherein the dynamic increase threshold is reduced if an increased bit rate is requested.

20. A method for dynamically adjusting the bit rate of a transmission, comprising:
- requesting a bit rate reduction;
- receiving a reduced bit rate;
- monitoring the transmission to determine whether to request a bit rate increase by:
  - determining a video loss for the transmission;
  - comparing the video loss to a predetermined video increase loss threshold;
  - if the video loss does not exceed the predetermined video increase loss threshold, then incrementing a loss threshold counter, the counter indicating the number of consecutive intervals in which the video loss is below the predetermined video increase loss threshold;
  - comparing the counter to a dynamic increase threshold;
  - if the loss threshold counter exceeds the dynamic increase threshold, then comparing a rate increase counter to the dynamic increase threshold;
  - if the rate increase counter is greater than or equal to the dynamic increase threshold, then requesting an increase in the bit rate; and
  - adjusting the dynamic increase threshold; and
- receiving an increased bit rate.

21. The method of claim 20, further comprising:
- if the rate increase counter is less than the dynamic increase threshold, then maintaining the bit rate and increasing the dynamic increase threshold.

22. The method of claim 20, further comprising:
- if the rate increase counter is greater than or equal to the dynamic increase threshold, then reducing the dynamic increase threshold.

23. A system for dynamically adjusting the bit rate of a transmission, comprising:
- a sending endpoint for sending the transmission and for receiving a request to adjust the bit rate; and
- a receiving endpoint for monitoring the transmission and for determining whether to request a bit adjustment by:
  - maintaining a plurality of parameters, including a rate increase counter that indicates a number of consecutive intervals since the last rate increase, a predetermined video loss reduction threshold, a dynamic reduction threshold, a predetermined video increase loss threshold, a dynamic increase threshold, and a loss threshold counter that indicates a number of consecutive intervals where a video loss is less than or equal to the predetermined video increase loss threshold;
  - determining a video loss;
  - based on the video loss, determining whether to request a bit rate adjustment by comparing the video loss to at least one of the plurality of parameters;
  - if the determination is to request a bit rate adjustment, then sending the request to adjust the bit rate to the sending endpoint; and
  - based on the determination, adjusting at least one of the parameters.

* * * * *

UNITED STATES PATENT AND TRADEMARK OFFICE
CERTIFICATE OF CORRECTION

PATENT NO. : 7,225,459 B2
APPLICATION NO. : 10/008100
DATED : May 29, 2007
INVENTOR(S) : Maximilian Matthew Magliaro It is certified that error appears in the above-identified patent and that said Letters Patent is hereby corrected as shown below:

Title Page, Item (73)
In Assignee:
"Numerex Investment Corproation" should read -- Numerex Investment Corporation --

Signed and Sealed this

Twenty-third Day of October, 2007

JON W. DUDAS
*Director of the United States Patent and Trademark Office*